(12) United States Patent
Kim et al.

(10) Patent No.: US 9,661,398 B2
(45) Date of Patent: May 23, 2017

(54) BROADCASTER APPARATUS, CONTENT OPERATOR APPARATUS, AND RECEIVING TERMINAL FOR AUGMENTED BROADCASTING SERVICE, AND AUGMENTED BROADCASTING SERVICE METHOD

(71) Applicant: Electronics and Telecommunications Research Institute, Daejeon-si (KR)

(72) Inventors: Soon Choul Kim, Daejeon-si (KR); Jeoung Lak Ha, Daejeon-si (KR); Bum Suk Choi, Daejeon-si (KR); Young Ho Jeong, Daejeon-si (KR); Jin Woo Hong, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 0 days.

(21) Appl. No.: 14/500,069

(22) Filed: Sep. 29, 2014

(65) Prior Publication Data
US 2015/0304740 A1 Oct. 22, 2015

(30) Foreign Application Priority Data

Apr. 18, 2014 (KR) .................. 10-2014-0046942

(51) Int. Cl.
| | |
|---|---|
| *H04N 21/2362* | (2011.01) |
| *H04N 21/258* | (2011.01) |
| *H04N 21/434* | (2011.01) |
| *H04N 21/462* | (2011.01) |
| *H04N 21/4722* | (2011.01) |
| *H04N 21/81* | (2011.01) |

(52) U.S. Cl.
CPC ...... *H04N 21/8146* (2013.01); *H04N 21/2362* (2013.01); *H04N 21/4345* (2013.01); *H04N 21/4622* (2013.01); *H04N 21/4722* (2013.01); *H04N 21/25875* (2013.01)

(58) Field of Classification Search
CPC ......... H04N 21/2353; H04N 21/25875; H04N 21/26283; H04N 21/435; H04N 21/8146
See application file for complete search history.

(56) References Cited

U.S. PATENT DOCUMENTS

| | | | | |
|---|---|---|---|---|
| 6,396,531 | B1* | 5/2002 | Gersberg | H04N 21/454 348/14.01 |
| 7,441,037 | B2* | 10/2008 | Saxena | H04N 21/23106 348/E7.063 |
| 2007/0250848 | A1* | 10/2007 | Gorti | H04N 21/4725 725/14 |
| 2008/0040762 | A1* | 2/2008 | Jung | H04N 21/235 725/110 |
| 2012/0011567 | A1* | 1/2012 | Cronk | H04N 21/25875 726/4 |

(Continued)

FOREIGN PATENT DOCUMENTS

KR   10-2012-0071592 A   7/2012

*Primary Examiner* — Randy Flynn
(74) *Attorney, Agent, or Firm* — NSIP Law (57) ABSTRACT

A broadcaster apparatus, content operator apparatus, and receiving terminal for augmented broadcasting service, and an augmented broadcasting service method. A service user may select a predetermined content operator among content operators that provide augmented content in an environment for providing an augmented broadcasting service according to an exemplary embodiment.

14 Claims, 8 Drawing Sheets

30

| | |
|---|---|
| DESCRIPTOR TAG | |
| DESCRIPTOR LENGTH | |
| CONTENT OPERATOR INFORMATION | THE NUMBER OF CONTENT OPERATORS |
| | CONTENT OPERATOR CODE |
| | CONTENT OPERATOR NAME |
| | CONTENT OPERATOR SERVER ADDRESS (URL) |
| | THE NUMBER OF SERVICES |
| | SERVICE NAME |
| | SERVICE SERVER ADDRESS (URL) |

(56) References Cited

U.S. PATENT DOCUMENTS

| | | |
|---|---|---|
| 2012/0164938 A1 | 6/2012 | Jeong et al. |
| 2012/0240177 A1* | 9/2012 | Rose .................... H04N 21/252 |
| | | 725/116 |
| 2012/0291073 A1* | 11/2012 | Friedman ........... H04N 21/4122 |
| | | 725/62 |
| 2013/0083063 A1* | 4/2013 | Geisner ................ G06T 19/006 |
| | | 345/633 |
| 2013/0239139 A1* | 9/2013 | Grover ............. H04N 21/47202 |
| | | 725/35 |
| 2013/0291023 A1* | 10/2013 | Choi ................. H04N 21/4312 |
| | | 725/59 |
| 2013/0305308 A1* | 11/2013 | Lee .................... H04N 21/4345 |
| | | 725/116 |

* cited by examiner

| | |
|---|---|
| DESCRIPTOR TAG | |
| DESCRIPTOR LENGTH | |
| CONTENT OPERATOR INFORMATION | THE NUMBER OF CONTENT OPERATORS |
| | CONTENT OPERATOR CODE |
| | CONTENT OPERATOR NAME |
| | CONTENT OPERATOR SERVER ADDRESS (URL) |
| | THE NUMBER OF SERVICES |
| | SERVICE NAME |
| | SERVICE SERVER ADDRESS (URL) |

BROADCASTER APPARATUS, CONTENT OPERATOR APPARATUS, AND RECEIVING TERMINAL FOR AUGMENTED BROADCASTING SERVICE, AND AUGMENTED BROADCASTING SERVICE METHOD

CROSS-REFERENCE TO RELATED APPLICATION(S)

This application claims the benefit under 35 U.S.C. §119 (a) of Korean Patent Application No. 10-2014-0046942, filed on Apr. 18, 2014, in the Korean Intellectual Property Office, the entire disclosure of which is incorporated herein by reference for all purposes.

BACKGROUND

1. Field

The following description relates to a broadcasting communication convergence technology; more specifically, to an augmented reality service.

2. Description of the Related Art

In the broadcasting field, an augmented reality broadcasting using augmented reality (AR) is used as a concept of adding a graphic element onto a broadcast image for an integrated broadcast program to enhance a viewer's understanding and fun to be produced into one broadcasting program and then transmitted. Developed from such an AR broadcasting concept, the augmented broadcasting is a broadcasting service that escapes the manner in which viewers are unilaterally provided with broadcast programs by naturally harmonizing augmented content through the broadcast programs with the internet and providing a selective service reception, thereby increasing the viewers' sense of reality and vitality.

SUMMARY

The following description relates to a broadcaster apparatus, a content operator apparatus, and a receiving terminal for an augmented broadcasting service, and an augmented broadcasting service method.

In one general aspect, a broadcaster apparatus includes: a broadcasting provider to supply broadcasting content to a receiving terminal; and a signal processor to provide, to the receiving terminal, content operator information with respect to each of a plurality of content operators to provide augmented content for a selection of a service user.

In another general aspect, a content operator includes: a broadcaster connector to be connected to a broadcaster to provide content operator information thereto; and a content provider to supply augmented content to a receiving terminal in response to selection from a service user through the receiving terminal among a plurality of content operators.

In another general aspect, a receiving terminal includes: a broadcasting receiver to receive a broadcasting signal that comprises content operator information as well as broadcasting content with respect to each of a plurality of content operators; a user input to receive input of a predetermined content operator, selected by a service user, among the plurality of the content operators; a content receiver to receive augmented content from the predetermined content operator selected through the user input; and an output to combine the broadcasting content received by the broadcasting receiver and the augmented content received by the content receiver, and display, on a screen, the content resulting from combining the broadcasting content and the augmented content.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
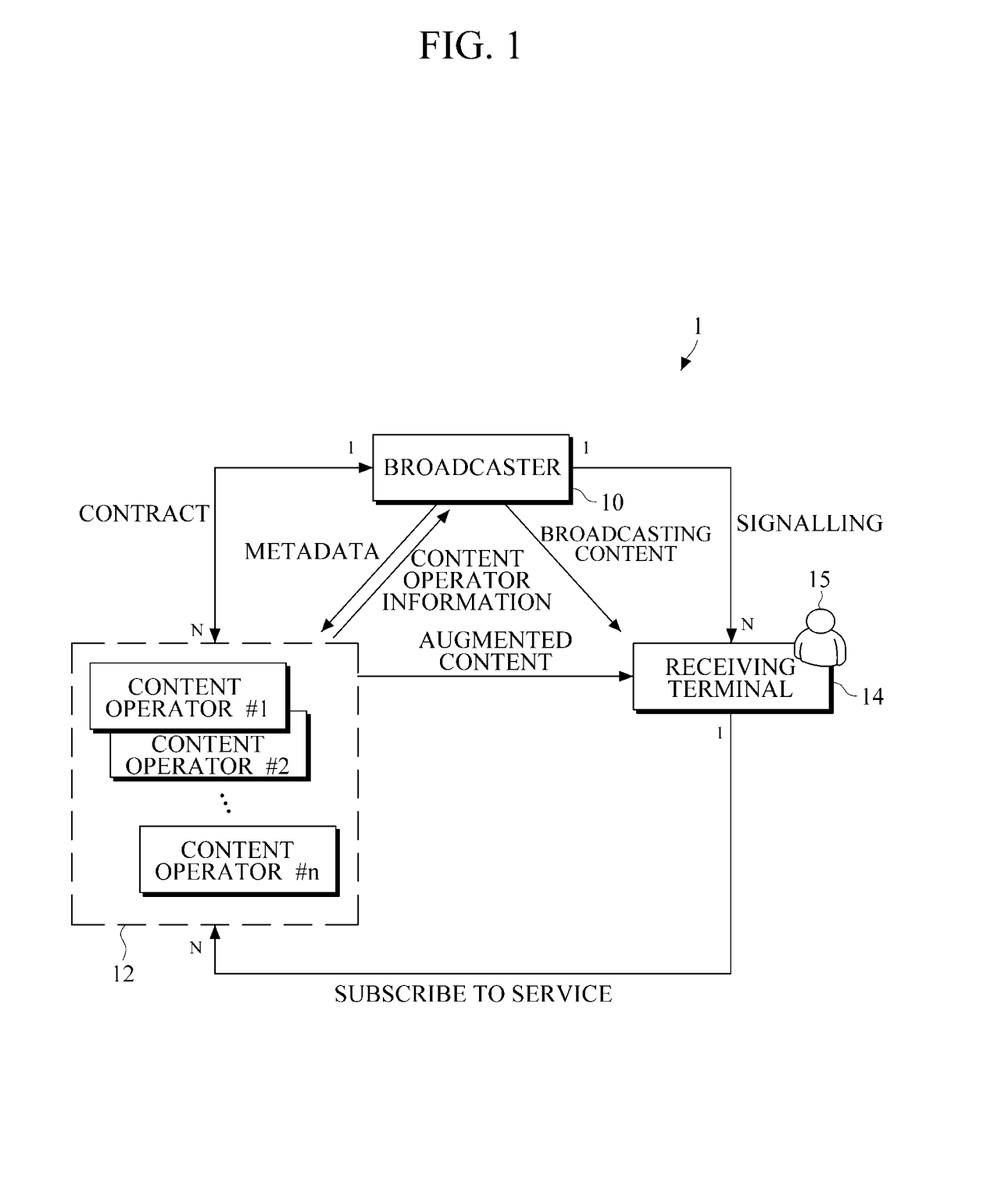
FIG. 1 is a diagram illustrating, based on service participants, a system for providing an augmented broadcasting service according to an exemplary embodiment.

FIG. 1 is a diagram illustrating, based on service participants, a system 1 for providing an augmented broadcasting service according to an exemplary embodiment.

Referring to FIG. 1, a system 1 for providing an augmented broadcasting service according to an exemplary embodiment includes a broadcaster 10, content operators 12, and a receiving terminal 14.

According to an exemplary embodiment, the broadcaster 10 that provides the broadcasting content and the content operators 12 that provide the augmented content are divided. There are a variety of the content operators 12, and there may be, for example, the n number of the content operators as illustrated in FIG. 1. The broadcaster 10 may make a contract with the content operators 12, each of which may provide the different augment content with regard to the same broadcasting content.

As each different augment content is provided from the content operators 12, various augmented broadcasting may be provided to a service user 15 from the point of view of the broadcaster 10. Similar to organizing each different advertisement broadcast according to each broadcasting content that the broadcaster 10 organizes and transmits, the augmented content provided by various content operators may be organized with respect to one broadcasting content.

From the point of view of the service user 15 who uses the augmented broadcasting service, the service user 15 may browse information on the content operators 12, select the desired content operator among the information, and receive the augmented content provided from the selected content operator. The information on the content operators 12 may be, for example, a server address (URL; the uniform resource locator) of each content operator. Thus, as a selection range of the content for the service user 15 widens, the service user 15 may use various augmented broadcasting services and enjoy personalized augmented broadcasting services. The service user 15 may, in real time, select a predetermined content operator and receive the augmented content provided by the selected content operator while viewing the broadcasting content provided by the broadcaster 10.

In an exemplary embodiment, the service user 15 may browse information on the content operators 12 and change the content operator, while viewing the broadcasting content that the current broadcaster 10 is transmitting. For example, the service user 15 may change the content operator from a first content operator to a second content operator while viewing the broadcasting program, and use an augmented broadcasting service after downloading augmented content from the changed content operator.

In an exemplary embodiment, a broadcaster 10 can provide broadcasting program and augmented content together as well as service signalling to a receiving terminal 14. The current AR broadcasting transmits one-sided multiplexing stream after blending visual component, while ARSTV broadcasting separates visual component as augmented content. A receiving terminal 14 can provide augmented content over broadcasting program by TV viewer's selection. A broadcaster 10 produces and distributes augmented content and plays a role of a content operator 12. A broadcaster 10 could optionally provide the augmented content only for allowed receiving terminals 14 as a value-add service model.

A broadcaster 10 can make contracts with one or more content operators 12 on business relation of augmented content delivery. Content operators 12 supply a broadcaster 10 with their URL information in order for receiving terminals 14 to access content severs. A broadcaster 10 can provide broadcasting program and program signalling as usual, and content operators 12 provide augmented content to a receiving terminal 14 respectively. A broadcaster 10 generates augmented broadcasting metadata and publishes to content operators 12 for pre-production of augmented content before a scheduled broadcasting program. The whole or partial video content will be released to content operators 12. The content operators 12 produce components based on augmentation region referred by the metadata and upload them to a content server with relevant information. Then broadcaster 10 is required to provide a linkage between the broadcasting program and the augmented content to a receiving terminal 14. A receiving terminal 14 can subscribe to one or more content operators 12 and provide a different augmented viewing experience by downloading augmented content from a preferred content operator 12 by a TV viewer.

Figure 2:
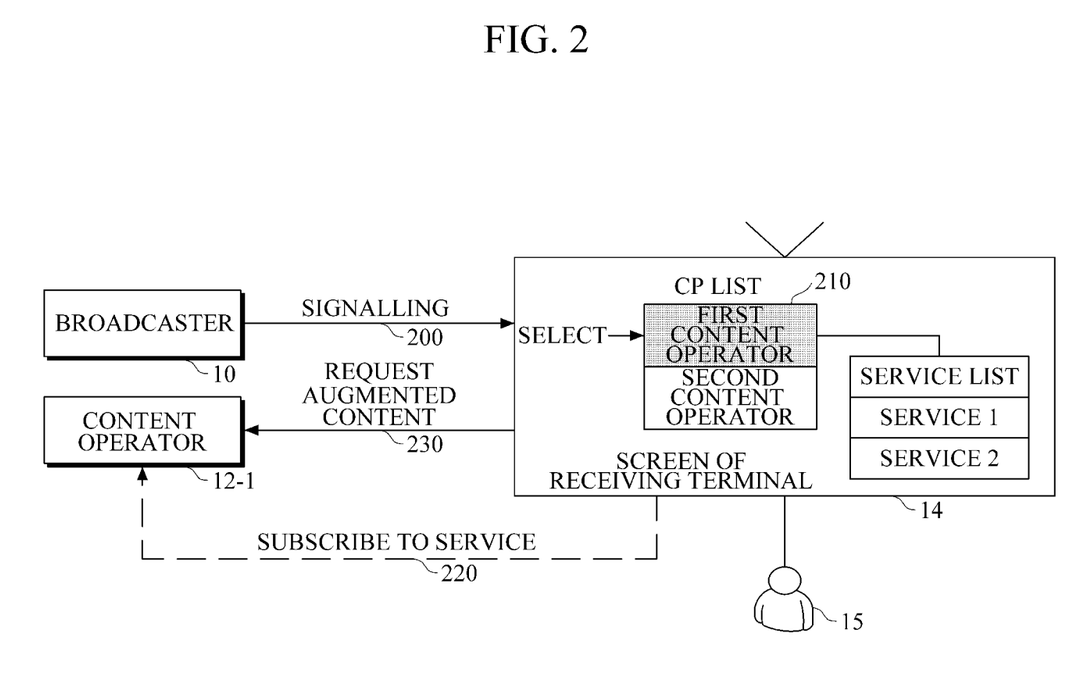
FIG. 2 is a diagram illustrating a signal transmission/reception flow between each of participants in an environment for providing an augmented broadcasting service according to an exemplary embodiment.

FIG. 2 is a diagram illustrating a signal transmission/reception flow between each of participants in an environment for providing an augmented broadcasting service according to an exemplary embodiment.

Referring to FIG. 2, a broadcaster 10 generates metadata on augmented content to be combined into broadcasting content based on the broadcasting content, and provides the metadata to a content operator 12-1 that is contracted with the broadcaster 10. The metadata includes: augmented area information that indicates a position of the augmented content displayed on a screen by being combined with the broadcasting content; augmented time information that indicates time to be combined with the broadcasting content; and augmented object information, such as the URL, which provides the augmented content to the augmented area. The broadcaster 10 may contract with two or more content operators.

The broadcaster 10 receives content operator information from the content operator 12-1 and transmits the received content operator information to a receiving terminal 14. Here, the broadcaster 10 may transmit the content operator information to the receiving terminal 14 using signaling information of a broadcasting network as illustrated in FIG. 2.

The content operator 12-1 receives metadata from the broadcaster 10, analyzes the received metadata, produces the augmented content suitable for the augmented area of the relevant broadcasting content, and provides the produced augmented content to the receiving terminal 14. The receiving terminal 14 requests the augmented content from the content operator 12-1, downloads the augmented content provided by the content operator 12-1, combines the augmented content with the broadcasting content, and outputs, to the screen, the content resulting from combining the augmented content and the broadcasting content, thereby providing the augmented broadcasting service to the service user 15.

The receiving terminal 14 is a terminal carried by the service user 15, who may view the augmented broadcasting with the receiving terminal 14. To this end, the receiving terminal 14 may be a set-top box (STB) or a smart TV. The receiving terminal 14 may be equipped with an augmented service platform. The receiving terminal may be configured into a single terminal or into various terminals. The service user 15 carrying the receiving terminal 14 may be an individual or members within a predetermined group.

In an exemplary embodiment, when acquiring the content operator information from the broadcaster 10, the receiving terminal 14 outputs the acquired content operator information to the screen. For example, as illustrated in FIG. 2, the receiving terminal 14 displays, on a screen, a content operator list that includes a first content operator and a second content operator. The service user 15 may browse the content operator list shown in the receiving terminal 14 and select a desired content operator. For example, as illustrated in FIG. 2, the service user 15 may select the first content operator. Here, service information, such as the service list provided by the selected content operator e.g., the first content operator, may be output to the screen.

In an exemplary embodiment, the service user 15 may subscribe to a predetermined content operator according to a service policy and use the augmented service from the subscribed content operator. Here, the service user 15 may, in real time, change the provider among the content operators to which the service user 15 has subscribed, and receive the augmented broadcasting while viewing a broadcasting program.

In an exemplary embodiment, to provide the augmented broadcasting service, the broadcaster 10 transmits channel information including an augmented broadcasting descriptor to the receiving terminal 14 and instructs the receiving terminal 14 to perform a reception process related to the augmented broadcasting service. Information on the content operators with respect to the broadcasting content being transmitted at that time is added to the augmented broadcasting descriptor, and is provided in the present disclosure. Thus, the receiving terminal 14 may, via the broadcasting network in real time, select the content operator that provides the broadcasting content being viewed and be provided with the augmented broadcasting service. The augmented broadcasting descriptor structure will be described below with reference to FIG. 3.

With reference to FIG. 2, a process of transmitting/receiving a signal among the broadcaster 10, the content operator 12-1, and the receiving terminal 14, using the augmented broadcasting descriptor, is described as follows: First, the broadcaster 10 transmits a broadcasting signal that includes the augmented broadcasting descriptor in 200. The receiving terminal 14 outputs a content operator (CP) information list, included in the augmented broadcasting descriptor, to the screen through a de-multiplexing process of the broadcasting signal in 210.

At this time, in a case where the service subscription takes priority according to a service policy, the content operator information may be in a deactivated state not to be selected by the service user 15. For the service user 15 to switch the content operator information to an activated state, the service subscription process is performed based on a unique identifier of the receiving terminal 14, e.g., a media access control (MAC) address or a set-top box (STB) ID in 220.

In an exemplary embodiment, the content operator information displayed on the screen is deactivated before the service subscription process 220, and is activated for the service user 15 to select after the service subscription is complete. While viewing the TV, if the service user 15 selects the content operator 12-1 in real time based on the content operator information activated and displayed on the TV screen of the receiving terminal 14, the receiving terminal 14 requests the augmented content from the content operator 12-1 in 230. When the augmented content is requested in 230, the receiving terminal 14 may request the augmented content, including an identifier of the receiving terminal 14 and an identification code of the content operator selected by the service user 15.

Figure 3:
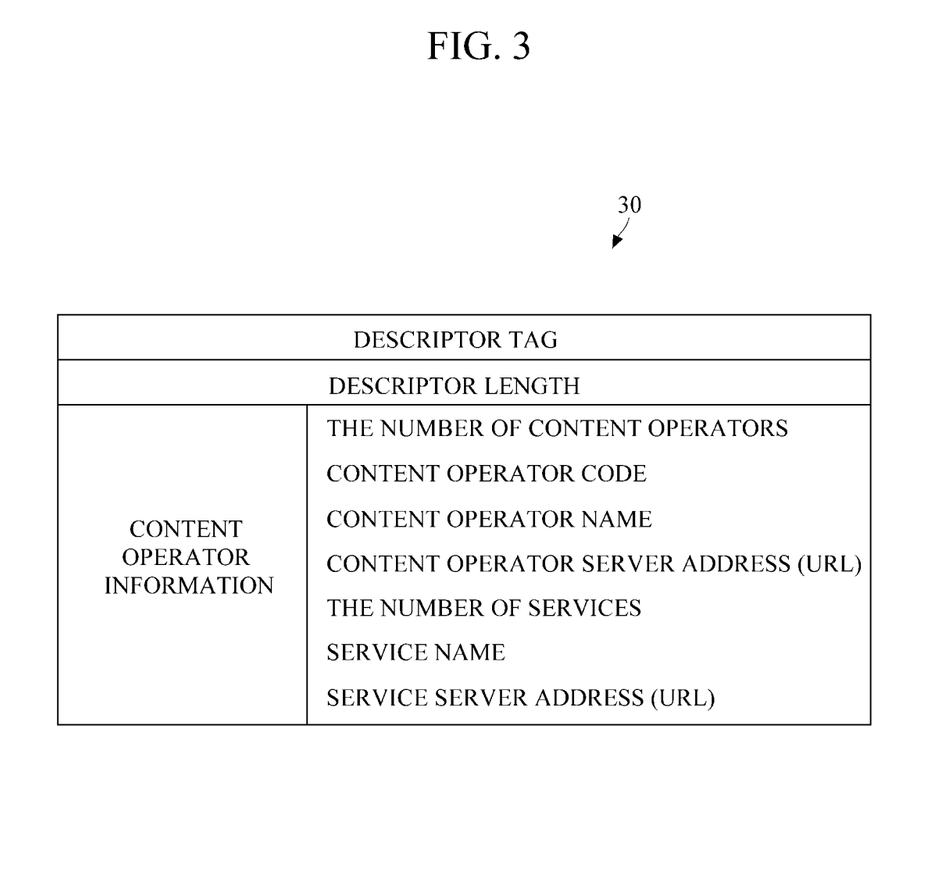
FIG. 3 is a diagram illustrating an augmented broadcasting descriptor including content operator information according to an exemplary embodiment.

FIG. 3 is a diagram illustrating an augmented broadcasting descriptor 30 including content operator information according to an exemplary embodiment.

Referring to FIG. 3, an augmented broadcasting descriptor 30 is a descriptor that determines whether a receiving terminal receives an augmented broadcasting stream. Specifically, the augmented broadcasting descriptor 30 includes a descriptor tag (descriptor_tag), a descriptor length (descriptor_length), and content operator information.

The descriptor tag is information for identifying the relevant descriptor as the augmented broadcasting descriptor. The descriptor length (descriptor_length) indicates an entire length of the relevant descriptor. The content operator information added to the augmented broadcasting descriptor 30 includes the number of the content operators (ContentProvider_Count), each content operator code (CProvider_Code), a content operator name (CProvider_Name), and a server address of the content operator (CProvider_URL). Also, the content operator information may further include the number of services (Service_Count) provided by each content operator, a service name (Service_Name), and a service server address (CProvider_Sub_URL).

In an exemplary embodiment, the augmented broadcasting descriptor 30 including the content operator information may be positioned within either a Virtual Channel Table (VCT) of the Program and System Information Protocol (PSIP) of a real-time broadcasting stream or a Program Map Table (PMT) of Program Specific Information (PSI) to be transmitted to a receiving terminal 14.

Figure 4:
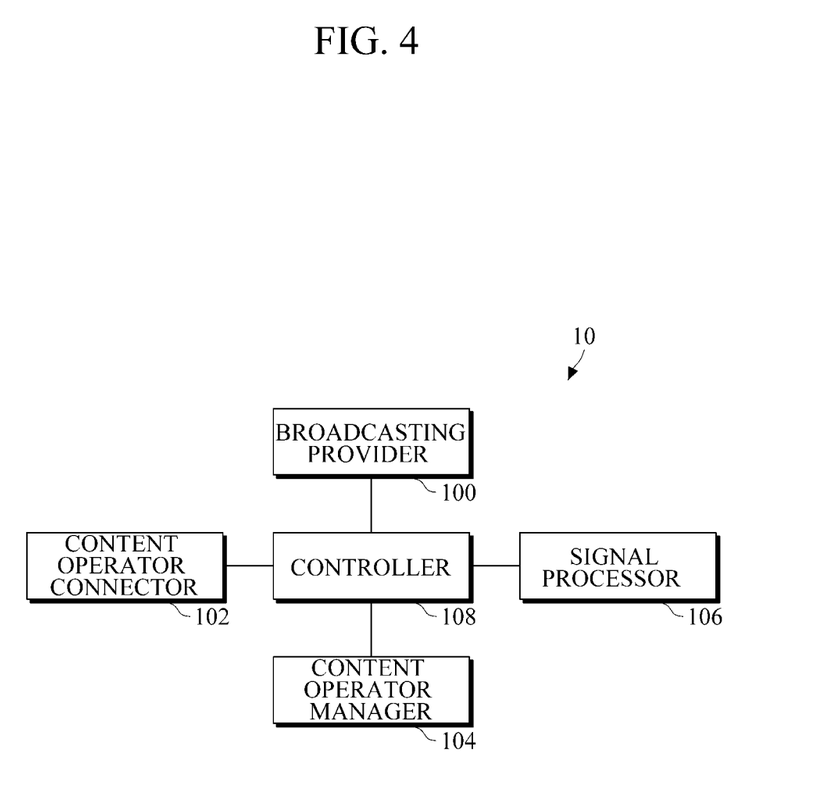
FIG. 4 is a detailed diagram illustrating a broadcaster according to an exemplary embodiment.

FIG. 4 is a detailed diagram illustrating a broadcaster 10 according to an exemplary embodiment.

Referring to FIGS. 2 and 4, a broadcaster 10 includes a broadcasting provider 100, a content operator connector 102, a content operator manager 10, a signal processor 106, and a controller 108.

The broadcasting provider 100 supplies broadcasting content to a receiving terminal 14. The broadcasting content may be a broadcasting program. The broadcasting program may be provided in real time. The signal processor 106 includes, in a broadcasting signal, content operator information with respect to each content operator for a selection of a service user 15 to provide the content operator information.

In an exemplary embodiment, the signal processor 106 provides the content operator information to the receiving terminal 14 while the receiving terminal 14 is receiving and playing the broadcasting content. Accordingly, while viewing the broadcasting through the receiving terminal 14, the service user 15 may receive the content operator information in real time and select the content operator. Also, the service user 15 may change the content operator that uses the service in real time.

In an exemplary embodiment, the signal processor 106 provides an augmented broadcasting descriptor that includes the content operator information to the receiving terminal 14. The content operator information may include the number of the content operators, a content operator code, a content operator name, and information on a content service subscription address. The augmented broadcasting descriptor that includes the content operator information may be positioned within the VCT of the PSIP or PMT of the PSI to be provided to the receiving terminal 14.

The content operator connector 102 is connected to the content operators to acquire the content operator information from each content operator. The content operator manager 104 manages the content operator information acquired from the content operator connector 102. The controller 108 controls each of the elements mentioned above and processes signals transmitted between each of the elements.

Figure 5:
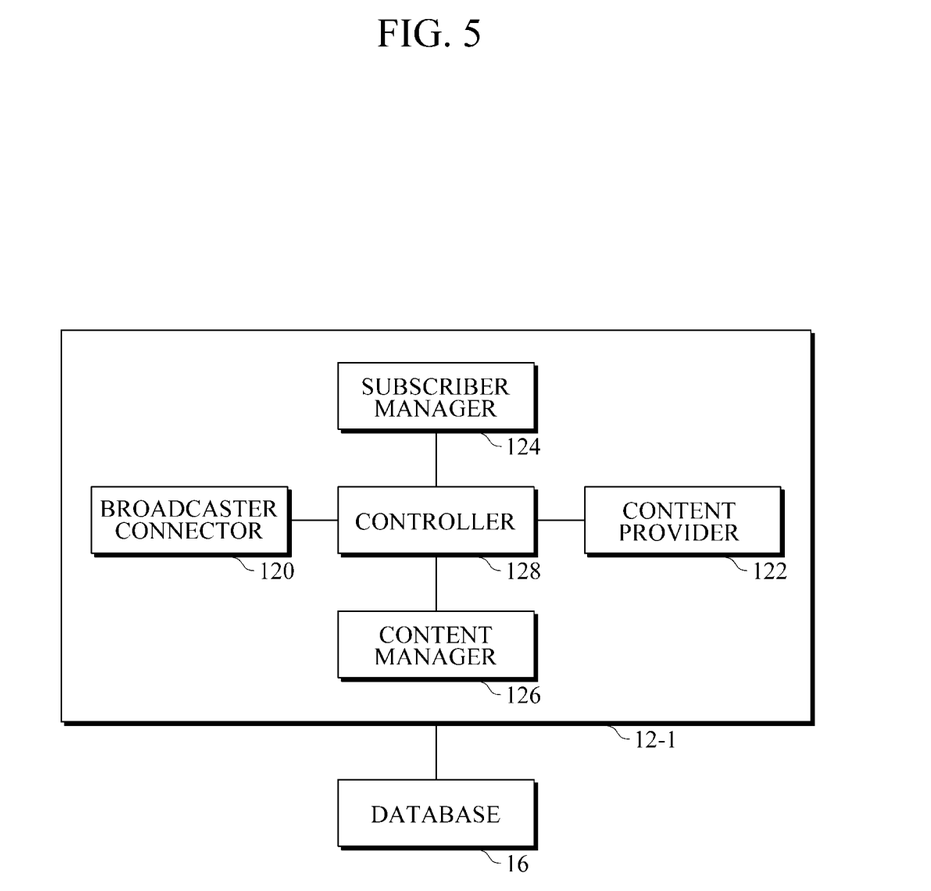
FIG. 5 is a detailed diagram illustrating a content operator according to an exemplary embodiment.

FIG. 5 is a detailed diagram illustrating a content operator 12-1 according to an exemplary embodiment.

Referring to FIGS. 2 and 5, a content operator 12-1 includes a broadcaster connector 120, a content provider 122, a subscriber manager 124, a content manager 126, and a controller 128.

The broadcaster connector 120 is connected to a broadcaster 10 to provide content operator information thereto. The content provider 122 supplies augmented content to a receiving terminal 14 when selected, among various content operators, by the service user 15 of the receiving terminal 14.

In an exemplary embodiment, as a message requesting the augmented content, which includes a terminal identifier and a content operator code, from the receiving terminal 14 is received, the content provider 122 supplies the augmented content to the relevant receiving terminal 14 by using the received terminal identifier.

In an exemplary embodiment, if the receiving terminal 14 requests a change of a content operator while providing the augmented content selected by the service user 15 to the receiving terminal 14, the content provider 122 quits providing the augmented content.

The subscriber manager 124 manages subscribers who have subscribed to an augmented broadcasting service through the receiving terminal 14. Here, the subscriber manager 124 processes a service subscription, modification, and deletion of the service user 15 by using identification information of the receiving terminal 14, and manages the receiving terminal 14. The subscriber manager 124 may store subscription information in database 16 and manages it.

In an exemplary embodiment, the subscriber manager 124 may check whether the service user 15 who wants to download the augmented content from the content operator 12 has subscribed to the augmented broadcasting service, and if the service user 15 has not subscribed, the subscriber manager 124 requests the service user 15 to subscribe to the augmented broadcasting service. In such a case, the content provider 122 may supply the augmented content to the receiving terminal 14 only when the service user 15 has subscribed.

The content manager 126 manages the augmented content to be provided to the receiving terminal 14. In an exemplary embodiment, the content manager 126 searches, from the database 16, the augmented content that the receiving terminal 14 has requested. An augmented content-providing directory, which maps at least one content operator for each augmented object, is stored in the database 16. A structure of the augmented content-providing directory will be specifically described below with reference to FIG. 7. The database 16 may be a form of being separated from the content operator 12-1 but connected through the networks as illustrated in FIG. 5; however, the database 16 may be positioned inside the content operator 12-1 to perform the same function. The content operator 12-1 may be a server form.

The content provider 122 supplies the augmented content searched by the content manager 126 to the receiving terminal 14. The controller 128 controls each of the elements mentioned above and processes signals transmitted between each of the elements.

Figure 6:
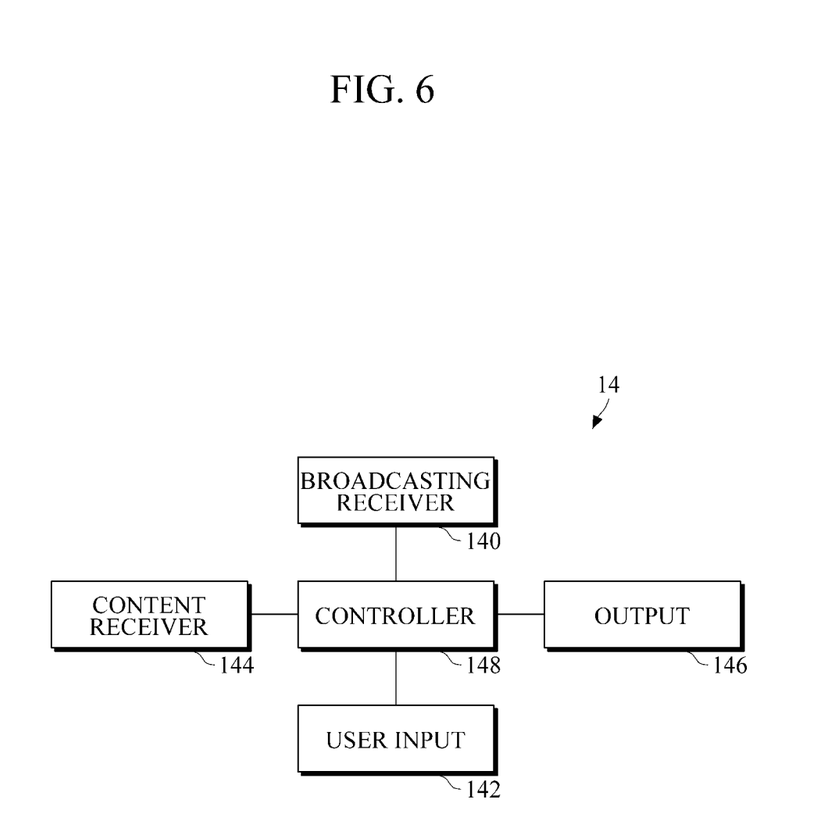
FIG. 6 is a detailed diagram illustrating a receiving terminal according to an exemplary embodiment.

FIG. 6 is a detailed diagram illustrating a receiving terminal 14 according to an exemplary embodiment.

Referring to FIGS. 2 and 6, the receiving terminal 14 includes a broadcasting receiver 140, a user input 142, a content receiver 144, an output 146, and a controller 148.

The broadcasting receiver 140 receives multiplexed broadcasting content and metadata, and an augmented broadcasting descriptor from a broadcaster 10 through a broadcasting network. The augmented broadcasting descriptor includes information on each of various content operators.

The content receiver 144 downloads and retains, based on the metadata, augmented content related to the broadcasting content from content operator 12-1 through internet networks. The output 146 synchronizes the augmented content and the broadcasting content according to a protocol defined in the metadata to thereby combine the augmented content and the broadcasting content and output the resulting content to a screen and provide it to a service user 15.

In an exemplary embodiment, the user input 142 receives input of a predetermined content operator 12-1, selected by the service user 15, among the content operators. Thus, the content receiver 144 receives the augmented content from the content operator 12-1 selected through the user input 142. The output 146 combines the broadcasting content, received through the broadcasting receiver 140, with the augmented content, received through the content receiver 144, displays it on the screen, and provides it to the service user 15. The controller 148 controls each of the elements mentioned above and processes signals transmitted between each of the elements.

Figure 7:
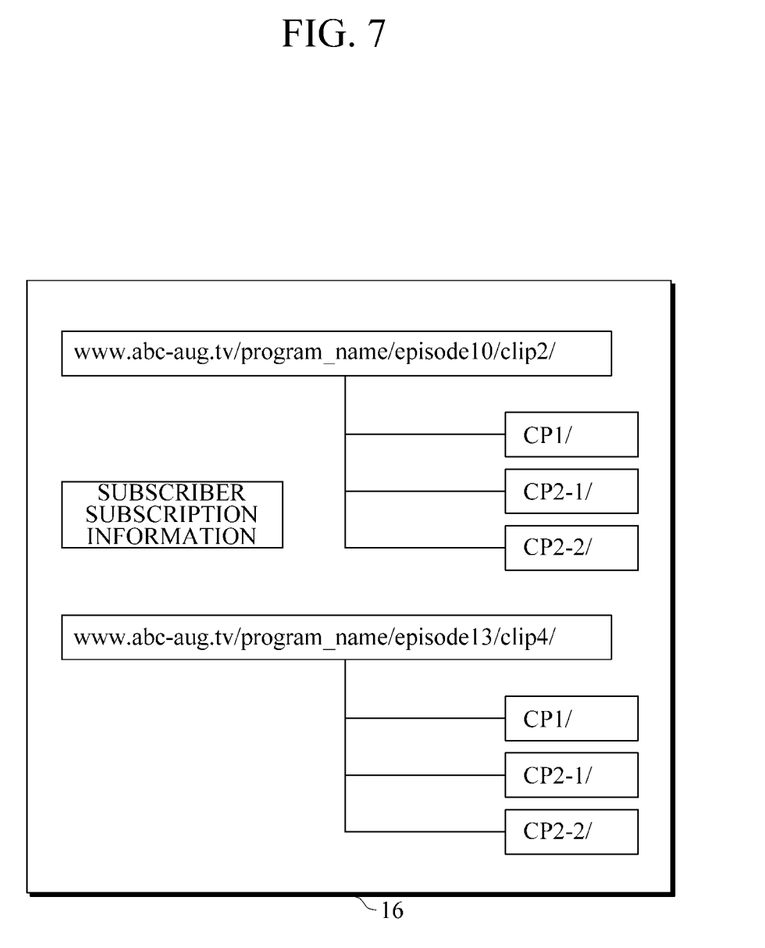
FIG. 7 is a diagram illustrating a structure of an augmented content-providing directory of a database according to an exemplary embodiment.

FIG. 7 is a diagram illustrating a structure of an augmented content-providing directory of a database 16 according to an exemplary embodiment.

Referring to FIGS. 2 and 7, if a receiving terminal requests augmented content according to a selection for a content operator from a service user based on a URL structure of augmented object information included within augmented broadcasting metadata, the content operator uses an augmented content-providing directory of a database 16 to search the augmented content and respond to the request.

The augmented object information included within the augmented broadcasting metadata is a download URL that provides augmented content related to the relevant broadcasting program. In other words, augmented object URL information included in the metadata does not include an identifier with respect to the content operator. Thus, the receiving terminal may distinguish the content operator from content operator information acquired through the broadcasting networks.

The content operator may search, in the database 16, information on the service user who has subscribed to the augmented broadcasting service to prevent reckless distribution of the augmented broadcasting content beforehand. The database 16 includes information on each of the augmented content. Each of the augmented objects has a directory structure based on both the augmented object URL according to a broadcasting program (program_name), an episode, and a clip, etc., and a CP distinguisher (CProvider_Code) of an augmented broadcasting content operator. For example, in the directory structure as illustrated in FIG. 7, in a case where the augmented object information within the metadata is www.abc-aug.tv/program_name/episode10/clip2/, the CP distinguisher may be CP1, CP2-1, and CP2-2.

Figure 8:
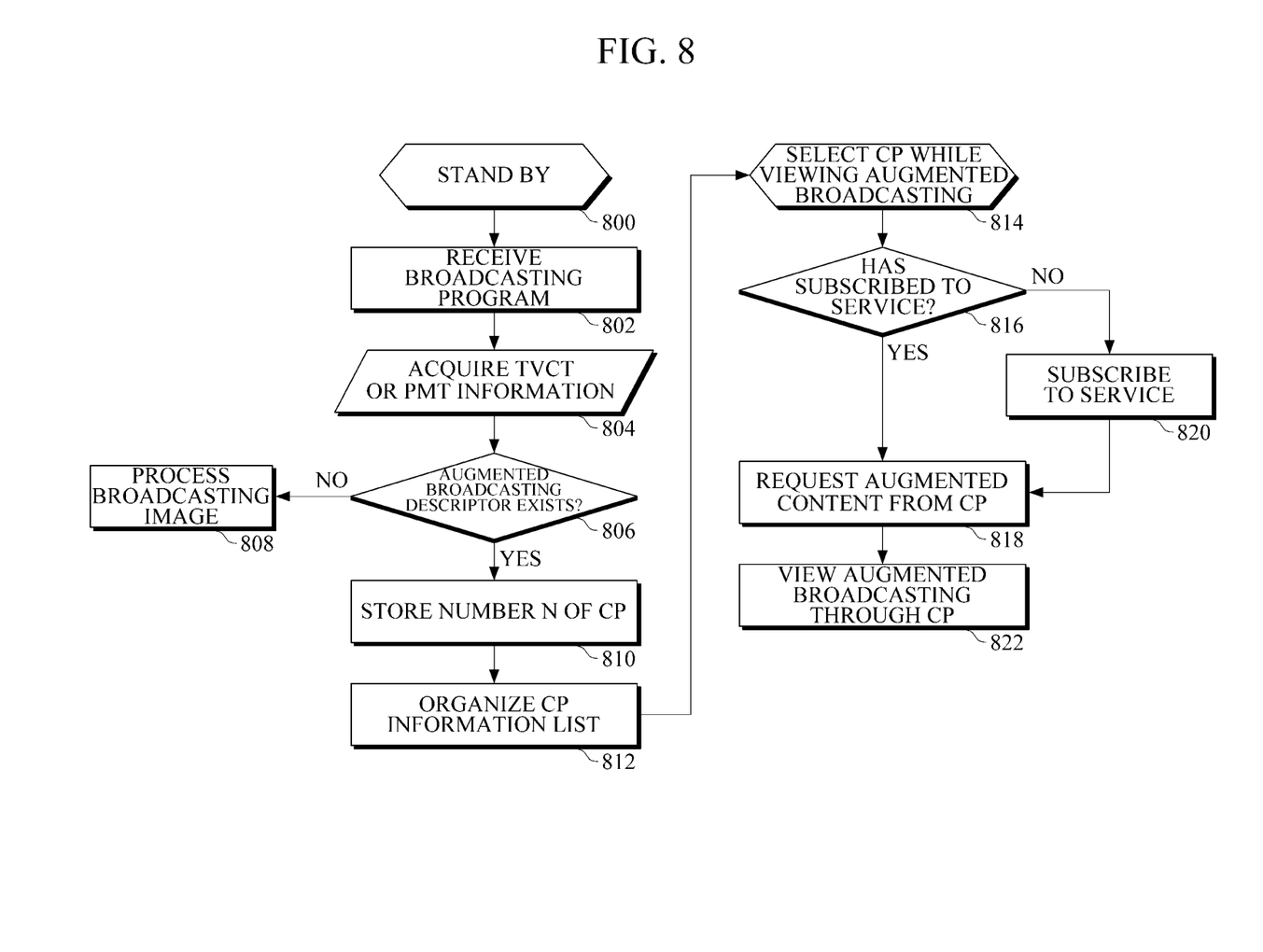
FIG. 8 is a flow chart illustrating a method for receiving an augmented broadcasting of a receiving terminal according to an exemplary embodiment.

FIG. 8 is a flow chart illustrating a method for receiving an augmented broadcasting of a receiving terminal 14 according to an exemplary embodiment.

Referring to FIGS. 2 and 8, the receiving terminal 14 acquires Terrestrial Virtual Channel Table (TVCT) or Program Map Table (PMT) information in 804 and retains an augmented broadcasting descriptor when receiving a broadcasting program in 802 from a broadcaster 10 through a broadcasting channel while standing by in 800. At this time, whether the augmented broadcasting descriptor exists is checked in 806, and if the augmented broadcasting descriptor does not exist, the receiving terminal 14 outputs a broadcasting program to a TV screen in 808 according to a decoding process using an existing broadcasting program.

In contrast, if the augmented broadcasting descriptor exists, the receiving terminal 14 stores the number N of content operators included in the augmented broadcasting descriptor in 810, parses provider information as the number N of the content operators included in the augmented broadcasting descriptor, organizes a CP list in 812, and provides it to a service user 15.

The service user 15 selects a predetermined CP in 814 after discerning information on the CPs providing the augmented content at present based on the CP list. The service user 15 may, in real time, change the CP and receive the augmented broadcasting even while viewing the augmented broadcasting.

The receiving terminal 14 requests augmented broadcasting content from a content operator 12-1 that the user selects. At this time, the receiving terminal 14 transmits, to the content operator 12-1, a message including a terminal ID that is provided when the service user 15 subscribes, and a content operator code selected by the service user 15, and requests the augmented content from the content operator 12-1 in 818. Then, the content operator 12-1 provides the augmented content that the receiving terminal 14 has requested, and the receiving terminal 14 is provided with the relevant augmented broadcasting service, and provides the relevant augmented broadcasting service to the service user 15 in 822. In a case where a service subscription is needed according to a service policy of the content operator 12-1, the service user 15 may use the augmented broadcasting content after a service subscription process 820 of the receiving terminal 14.

In an exemplary embodiment, the service user may select a predetermined content operator (CP) among the content operators that provide the augmented content in an environment providing the augmented broadcasting service. In other words, the broadcaster may provide, to the service user, information on each content operator capable of providing different augmented content related to the broadcasting content that is on the air. Thus, the service user may see the information on the content operators provided from the broadcaster while viewing the broadcasting and select the content operator in real time. The service user may be provided with the augmented content from the selected content operator. In addition, the service user may change the content operator in real time while viewing the broadcasting to thereby be provided with the augmented content from the changed content operator.

The augmented broadcasting service is a business structure that creates a profit model by allotting predetermined space on the broadcasting screen to the content operator so that the broadcaster can overlay the augmented content based on the broadcasting content. The broadcaster encourages participation and competition of various content operators and controls a right to provide information to thereby increase the competitiveness of the augmented broadcasting service.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A broadcaster apparatus, comprising:
    a broadcasting providing device configured to supply broadcasting content to a receiving terminal; and
    a signal processing device configured to provide, to the receiving terminal, content operator information, from among content operators, to provide augmented reality content for selection by a service user,
    wherein the signal processing device is further configured to provide, to the receiving terminal, an augmented broadcasting descriptor comprising the content operator information, and the content operator information comprises a content operator server address, and
    wherein the content operator information comprises a list of content operators, and respectively, content operator codes, content operator names, content operator server addresses, services provided by the content operators, service names, and service server addresses.

2. The broadcaster apparatus of claim 1, wherein the signal processing device is further configured to provide the content operator information to the receiving terminal while the receiving terminal receives and plays the broadcasting content.

3. The broadcaster apparatus of claim 1, wherein the augmented broadcasting descriptor is positioned within either a Virtual Channel Table (VCT) of a Program and System Information Protocol (PSIP) of a real-time broadcasting stream or a Program Map Table (PMT) of Program Specific Information (PSI) provided to the receiving terminal.

4. The broadcaster apparatus of claim 1, further comprising:
    a content operator connecting device configured to be connected to the content operators so as to acquire the content operator information from the content operators; and
    a content operator managing device configured to manage the content operator information acquired from the content operator connecting device.

5. A content operator apparatus, comprising:
    a broadcaster connecting device configured to be connected to a broadcaster to provide content operator information thereto; and
    a content providing device configured to supply augmented reality content to a receiving terminal in response to selection, by a service user, of a content operator among content operators,
    wherein the augmented reality content is provided in response to the receiving terminal receiving a broadcast signal comprising a broadcasting descriptor retained by the receiving terminal and comprising the content operator information, and
    wherein the content operator information comprises a list of content operators, and respectively, content operator codes, content operator names, content operator server addresses, services provided by the content operators, service names, and service server addresses.

6. The content operator apparatus of claim 5, wherein the content providing device is further configured to, in response to reception of a message from the receiving terminal that requests the augmented reality content, the message comprising a terminal identifier and a content operator code, supply the augmented reality content to the receiving terminal by using the received terminal identifier.

7. The content operator apparatus of claim 5, wherein the content providing device is further configured to stop providing the augmented reality content to the receiving terminal in response to a request received from the receiving terminal, the request comprising a change of content operator, while the content providing device is supplying the augmented reality content to the receiving terminal.

8. The content operator apparatus of claim 5, further comprising:
    a subscriber managing device configured to process a service subscription of the service user using identification information of the receiving terminal, and to manage receipt of the augmented reality content by the receiving terminal.

9. The content operator apparatus of claim 8, wherein:
    the subscriber managing device is further configured to determine whether the service user is subscribed to an augmented broadcasting service, and in response to a determination that the service user is not subscribed to the augmented broadcasting service, request the service user to subscribe to the augmented broadcasting service; and the content providing device is further configured to supply the augmented reality content to the receiving terminal in response to the service user being subscribed to the augmented broadcasting service.

10. The content operator apparatus of claim 5, further comprising:
a content managing device configured to search the augmented reality content, which the receiving terminal has requested, from a database that comprises an augmented reality content-providing directory, which respectively maps content operators to augmented reality objects,
wherein the content providing device is configured to supply the augmented reality content searched by the content manager.

11. A receiving terminal, comprising:
a broadcasting receiving device configured to receive a broadcasting signal that comprises content operator information and broadcasting content with respect to content operators;
a user input device configured to receive input of a predetermined content operator, selected by a service user, among the content operators;
a content receiver device configured to receive augmented reality content from the predetermined content operator selected through the user input device; and
an output device configured to combine the broadcasting content and the augmented reality content, and display, on a screen, the combination of the broadcasting content and the augmented reality content,
wherein
the augmented reality content is provided in response to the signal received by the receiving terminal, the signal comprising a broadcasting descriptor retained by the receiving terminal; and
the broadcasting receiving device is further configured to extract the content operator information of the content operators comprised in the broadcasting descriptor, and
wherein the content operator information comprises a list of content operators, and respectively, content operator codes, content operator names, content operator server addresses, services provided by the content operators, service names, and service server addresses.

12. The receiving terminal of claim 11, wherein the output device is further configured to display a content operator list on the screen, and receive input of the predetermined content operator.

13. The receiving terminal of claim 12, wherein the output device is further configured to, with regard to a receiving terminal which has not subscribed to the predetermined content operator, display, in a deactivated state, the content operator information in the content operator list so that after subscribing to the predetermined content operator, the receiving terminal uses an augmented broadcasting service.

14. The receiving terminal of claim 11, wherein the user input device is further configured to receive, from the service user, a request to change to a second content operator while receiving the augmented reality content from the predetermined content operator.

* * * * *